US007877733B2

(12) United States Patent
Parkinson et al.

(10) Patent No.: US 7,877,733 B2
(45) Date of Patent: Jan. 25, 2011

(54) FAILURE TEST FRAMEWORK

(75) Inventors: Paul Parkinson, Mt. Royal, NJ (US); Greg Pavlik, Shamong, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 839 days.

(21) Appl. No.: 10/890,237

(22) Filed: Jul. 14, 2004

(65) Prior Publication Data
US 2006/0015852 A1    Jan. 19, 2006

(51) Int. Cl.
*G06F 9/44* (2006.01)
*G06F 11/00* (2006.01)
*G06F 9/46* (2006.01)

(52) U.S. Cl. .......................... 717/127; 717/131; 714/33; 719/328

(58) Field of Classification Search ........................ None
See application file for complete search history.

(56) References Cited

U.S. PATENT DOCUMENTS

| | | | |
|---|---|---|---|
| 6,243,833 B1 * | 6/2001 | Hitchcock et al. | 714/33 |
| 6,477,666 B1 * | 11/2002 | Sanchez et al. | 714/41 |
| 6,971,048 B1 * | 11/2005 | Hanson et al. | 714/41 |
| 6,981,246 B2 * | 12/2005 | Dunn | 717/127 |
| 7,716,647 B2 * | 5/2010 | Loh et al. | 717/127 |
| 2002/0129337 A1 * | 9/2002 | Evans et al. | 717/124 |
| 2002/0144245 A1 * | 10/2002 | Lueh | 717/140 |
| 2004/0267516 A1 * | 12/2004 | Jibbe et al. | 703/24 |
| 2005/0081218 A1 * | 4/2005 | Acott et al. | 719/328 |
| 2005/0125777 A1 * | 6/2005 | Calder et al. | 717/131 |

OTHER PUBLICATIONS

"On built-in test reuse in object-oriented framework design", Wang et al., Mar. 2000, pp. 7-12, <http://delivery.acm.org/10.1145/360000/351943/a7-wang.pdf>.*
"Towards a better understanding of failure modes and test requirements of ADCs", Lechner et al., Mar. 2001, p. 803, <http://delivery.acm.org/10.1145/370000/367994/p803-lechner.pdf>.*
"A framework for component deployment testing", Bertolino et al., May 2003, pp. 221-231, <http://delivery.acm.org/10.1145/780000/776843/p221-bertolino.pdf>.*

* cited by examiner

*Primary Examiner*—Thuy Dao
(74) *Attorney, Agent, or Firm*—Hanify & King, P.C.

(57) ABSTRACT

A framework by which arbitrary routines may be executed in reaction to specific events for analysis and testing, while avoiding the need to manipulate the actual code being monitored. A method for performing functional failure testing of a software-based system comprises monitoring execution of target software for occurrence of a specified event, in response to detecting occurrence of the specified event, performing an action to cause or simulate a failure of the target software or of software or hardware that operatively interacts with the target software, and monitoring the target software for a response to the performed action.

19 Claims, 6 Drawing Sheets

FAILURE TEST FRAMEWORK

BACKGROUND OF THE INVENTION

1. Field of the Invention

The present invention relates to a software failure test framework by which arbitrary routines may be executed in reaction to specific events for analysis and testing.

2. Background of the Prior Art

Software quality control is a necessary task in order to provide software that properly performs its designed functions. One important aspect of software quality control is functional testing. Functional testing exercises the operation of the software under relatively realistic operating conditions. In order to provide a thorough and realistic test, the software must be tested not only under normal operating conditions, but also under conditions in which errors occur.

Previously, in order to emulate particular runtime situations for functional testing, for example, as in the case of third-party failure, it was necessary to implement intrusive techniques such as creating special test builds of the software being tested, in which these error simulations are introduced into the software itself. This technique is not only threatening to the software development process, it is generally not sufficiently effective at recreating an accurate simulation. For example, where interaction with distributed and third party software is needed, but the source code for such software is not available, error simulations of such software may not be sufficiently accurate for testing purposes.

Another approach is to mock out certain aspects of the system. However, this takes away any potentially unexpected behavior of the actual, practical system involved and also relies on the accuracy of third-party systems implementations of specifications, both of which may not be sufficient in critical real life solutions. A need arises for a technique by which arbitrary routines may be executed in reaction to specific events for analysis and testing, while avoiding the need to manipulate the actual code being monitored. This would provide the capability to accurately model failure scenarios, while avoiding the need for special test builds of the software under test. Such a technique would be useful in many scenarios, such as transactional processing failure and recovery and security.

SUMMARY OF THE INVENTION

The present invention provides a framework by which arbitrary routines may be executed in reaction to specific events for analysis and testing, while avoiding the need to manipulate the actual code being monitored. In one embodiment, the present invention uses the Java Debugging Interfaces to monitor java processes for specific events such as method entry, line number, all of the methods of a class or package, all exceptions, etc. Upon occurrence of such an event, a reaction is executed in order to introduce a failure, analyze the current state of the software or participating resources, manipulate parameters, etc. Examples of such reactions in the framework respectively include the communication loss or shutdown of application servers, databases, messaging systems, etc. while engaged in transactional processing, the analysis of recovery states all along the life-cycle of such failure, the manipulation and forwarding of responses as in the case of security information, response codes, and so on.

In one embodiment of the present invention, a method for performing functional failure testing of a software-based system comprises monitoring execution of target software for occurrence of a specified event, in response to detecting occurrence of the specified event, performing an action to cause or simulate a failure of the target software or of software or hardware that operatively interacts with the target software, and monitoring the target software for a response to the performed action. The method may further comprise defining the specified event based on a particular action to be taken by the target software under test that would indicates that a particular failure action should be initiated and defining instructions specifying the action to be taken by the framework in response to detecting the specified event. The method may further comprise attaching to the target software and starting execution of the target software. The target software may comprise at least one Java process. The target software may comprise at least one Java process and at least one native process. The target software may comprise at least one Java process and the method may further comprise starting execution of a Java virtual machine with debugging capability, attaching to the Java process, and starting execution of the Java process. The monitoring step may comprise monitoring execution of the Java process using the debugging capability. The method may further comprise detecting occurrence of the specified event with the debugging capability and transmitting a notification that the specified event was detected. The method may further comprise in response to receiving the notification that the specified event was detected, starting execution of the action and attaching the action to the Java process.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides a framework by which arbitrary routines may be executed in reaction to specific events for analysis and testing, while avoiding the need to manipulate the actual code being monitored. In one embodiment, the present invention uses the Java Debugging Interfaces to monitor java processes for specific events such as method entry, line number, all of the methods of a class or package, all exceptions, etc. Upon occurrence of such an event, a reaction is executed in order to introduce a failure, analyze the current state of the software or participating resources, manipulate parameters, etc. Examples of such reactions in the framework respectively include the communication loss or shutdown of application servers, databases, messaging systems, etc. while engaged in transactional processing, the analysis of recovery states all along the life-cycle of such failure, the manipulation and forwarding of responses as in the case of security information, response codes, and so on.

While, for simplicity and clarity of description, the present invention is described in terms of the JAVA® programming language and programming system, one of skill in the art would recognize that the present invention is equally applicable to implementation using any programming language and programming system. The present invention contemplates the use of any programming language and programming system.

Figure 1:
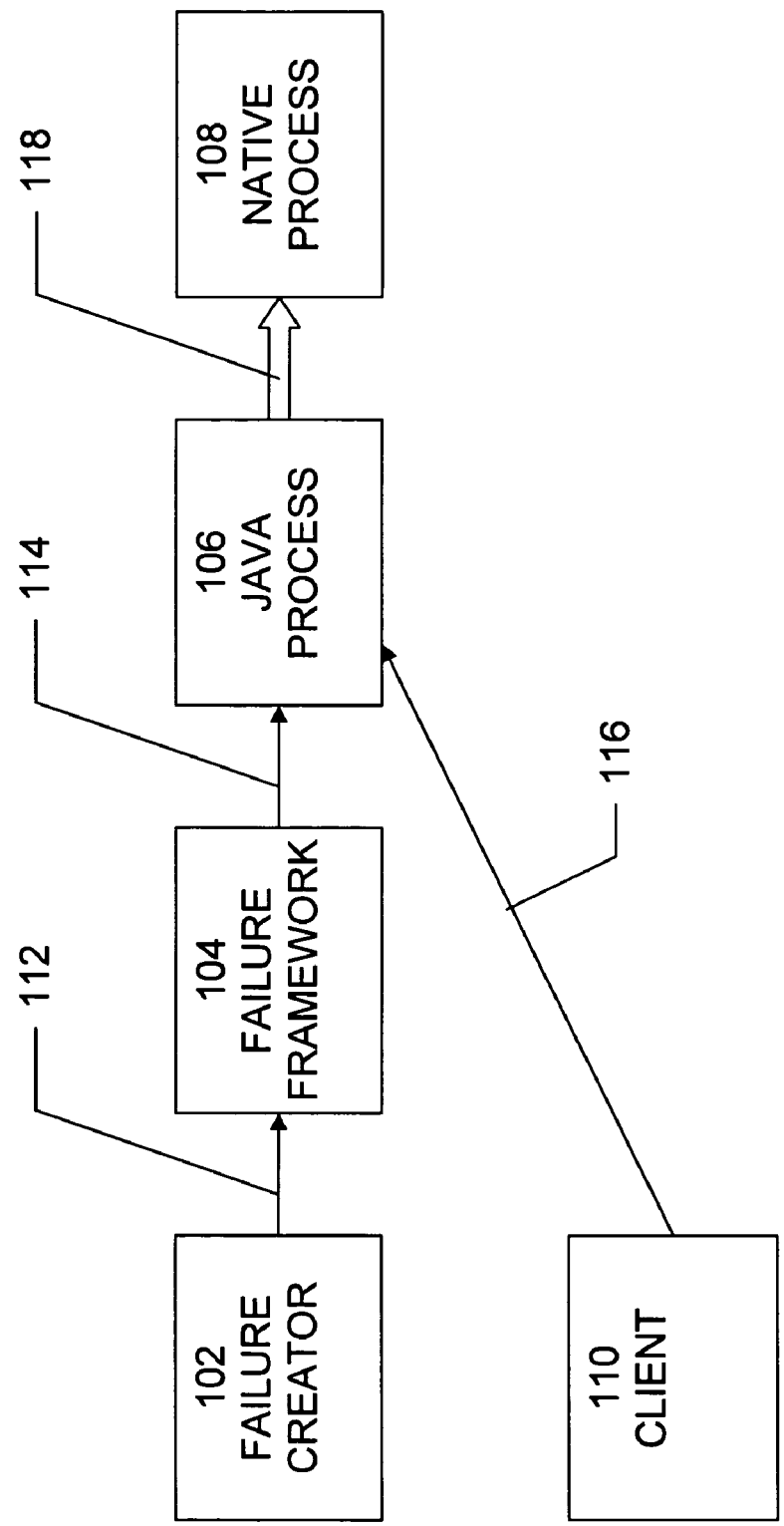
FIG. 1 is an exemplary block diagram of the components involved in the operation of the present invention.

An exemplary block diagram of the components involved in the operation of the present invention is shown in FIG. 1. These components include failure creator 102, failure framework 104, Java process 106, native process 108, and client 110. Failure creator 102 configures the failure framework 104 by setting values via the built-in application programming interface (API) of failure framework 104 or by supplying failure framework 104 with a custom failure object that defines the events to listen for and the failure actions to perform when these events are detected. Client 110 initiates the routine that will trigger the event in the Java Process that the Failure Framework is listening for. This event that the Framework is listening for is the one the failure creator 102 has specified. It is likely the case that the failure creator 102 and client 110 will be initiated from the same source, as the failure must be set up before the client initiates the routine that will in turn trigger the event set. Java Process 106 is an example of target software that is analyzed and/or manipulated by the Failure Framework. This also includes any processes dependent upon the primary. These are started before the routine is initiated by the client. Native Process 108 is an example of a process that may be called by Java process 106, for example, via a bridging mechanism such as JNI. This allows framework 107 to listen for execution points in non-Java libraries. This simply illustrates an additional function of the framework and is not a necessary component.

Failure creator 102 has a one to one-or-more relationship 112 with failure framework 104, failure framework 104 has a one to one-or-more relationship 114 with Java process 106, client 110 has a one to one-or-more relationship 116 with Java process 106, and Java process 106 has a one to zero-or-more relationship 118 via JNI calls with native process 108.

It is likely the case that the Failure Creator and Client will be initiated from the same source as the failure must be set up before the client initiates the routine that will in turn trigger the event set. The targets for analysis and/or manipulation and dependents thereof are obviously started before this routine is initiated. The Java process may call into a native process via a mechanism such JNI thereby allowing the framework to listen for execution points in non-Java libraries, however, this simply illustrates an additional function of the framework and is not a necessary component.

A simple use case of this functionality involves testing the runtime behavior in a transaction processing system such as those described in the Distributed Transaction Protocol and XA specifications produced by the Open Group. Implementations of these specifications provide a coordinator that manages multiple persisted resources such as databases, messaging systems, and mainframes within a global scope or transaction such that the principle criteria of atomicity, consistency, isolation, and durability (known as ACID properties) are insured. Though these aspects are related for this example we will focus on the atomicity guarantee that a transaction is a discrete unit of work and that all constituent operations must either succeed or fail. These operations may include queuing messages, updating databases, and displaying the results of a transaction on a screen.

A typical example is the transfer of money from one bank account to another. In this transaction the transfer amount must both be subtracted from the original account and added to the destination account in order to satisfy the atomicity requirement. If there is a failure in either account during this process the amount must remain in the original account only. In other words, any work conducted prior to the failure must be rolled back to the original state.

This example also illustrates the components involved in a Transaction Processor (TP) system, namely the Application Program, such as the web application, bank teller console, etc. that is issuing the command to transfer, the databases containing the bank accounts, which are the participants or Resource Managers (RMs), and the Transaction Processor which coordinates the RMs.

Figure 2:
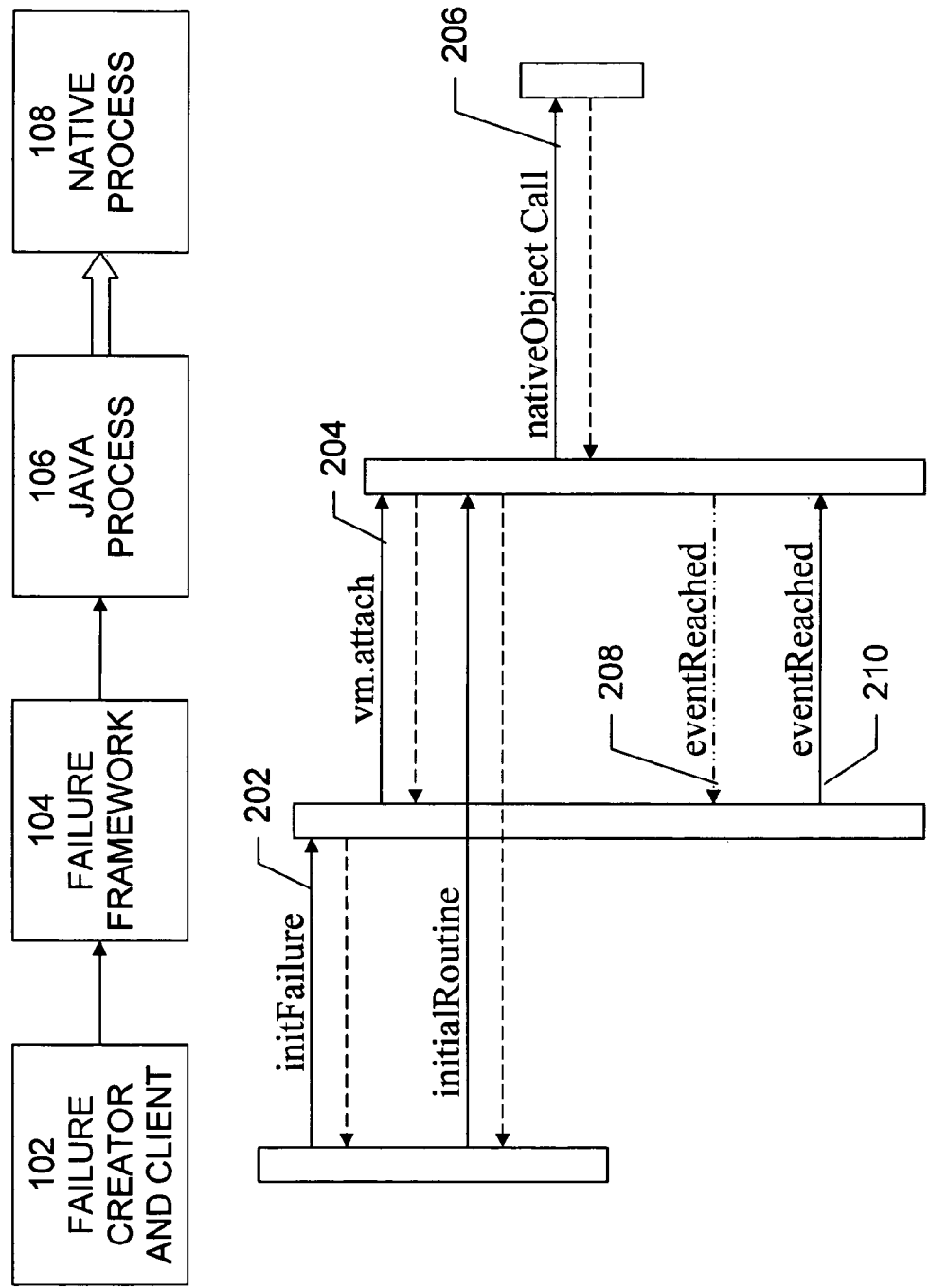
FIG. 2 is an exemplary sequence diagram illustrating the interaction of the objects shown in FIG. 1.
Figure 3:
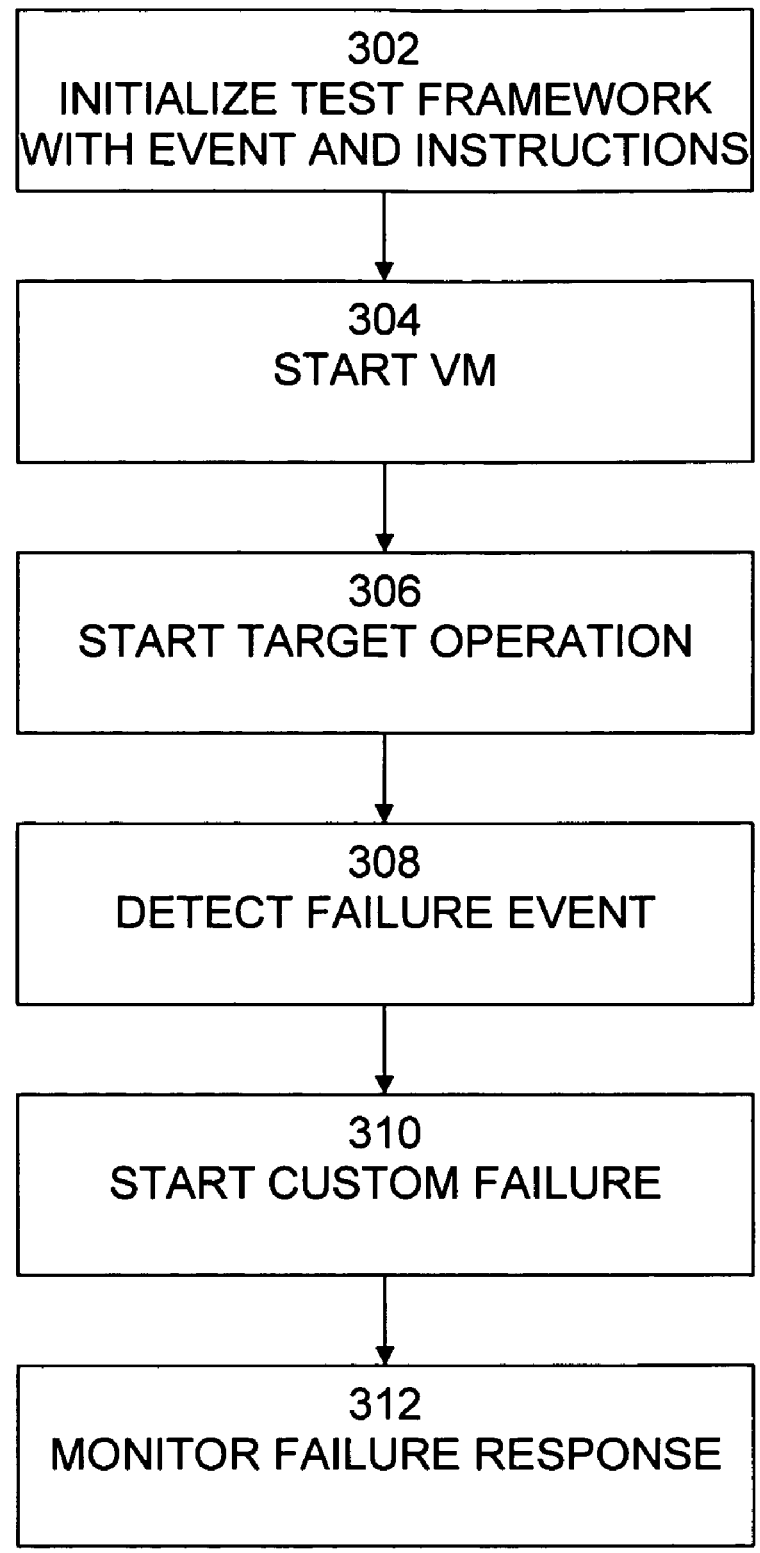
FIG. 3 is an exemplary flow diagram of a process of operation of the failure framework of the present invention.

An exemplary sequence diagram illustrating the interaction of the objects shown in FIG. 1, is shown in FIG. 2. The example shown in FIG. 2 assumes that the target has been started. (the dotted line is used to represent a JDWP callback from the target Java Process for an event the Failure Framework is listening for). FIG. 2 is best viewed in conjunction with FIG. 3, which is an exemplary flow diagram of a process 300 of operation of the framework of the present invention is shown in FIG. 3. This example is illustrated in the context of failure testing a Transaction Processor system using the Java programming system, but is equally applicable to failure testing of any type of software/programming or software/hardware system.

Process 300 begins with step 302, in which the failure framework 104 is initialized with the failure event that the framework is to listen for. This is done by transmission of initFailure object 202 from failure creator 102 to failure framework 104. The initFailure object 202 includes a failure event specification, which defines a particular action taken by the target software under test that indicates that a particular failure action should be initiated. In addition, initFailure object 202 includes an instruction set specifying the failure actions to be taken by the framework in response to the event. The instruction set can be of arbitrary complexity—that is, it can be as simple or complex as required. In this example a method entry event on the commit method of the Transaction class (the commit method is the point in the transaction routine where the TP will tell all participating resource managers to persist work conducted) is set along with a failure reaction of to shutdown the TP/VM. The equivalent lines of code could be as simple as the following:

simpleFailure.setMethodEntryEvent
        ("TransactionImp1.commit");
    simpleFailure.setFailureType("shutdown");

In step 304, the Java virtual machine (VM) where the TP runs is started with Java Debug Wire Protocol (JDWP) properties such as the following:

java -Xdebug -Xnoagent -Djava.compiler=NONE -Xrunjdwp:transport=dt_socket, server=y, suspend=n, address=5001 TransactionProcessor The Java Debug Wire Protocol (JDWP) is the protocol used for communication between a debugger and the Java virtual machine (VM) which it debugs. Thus, vm.attach 204 attaches failure framework 104 to Java process 106. In the case of other programming systems, the underlying processes necessary to support execution of the failure test framework and the software being tested are started.

In step 306, the software under test, such as Java process 106, is started. For example, the bank transfer is initiated. Execution of the software under test proceeds. For example, Java process 106 may perform a native object call 206 to native process 108. In step 308, the failure event is detected in the software under test, such as Java process 106 or native process 108. An eventReached notification 208 is transmitted from Java Process 106 to failure framework 104. This indicates that a particular failure action should be initiated. In step 310, the custom failure action defined by the instruction set is then started and attaches to the target/TP by use of eventreached object 210. In step 312, the expected result is asserted and the actual response of the target operation is monitored. In this example we should see that no funds were transferred as the TP crashed before it could call commit on any of the account databases involved.

Figure 4:
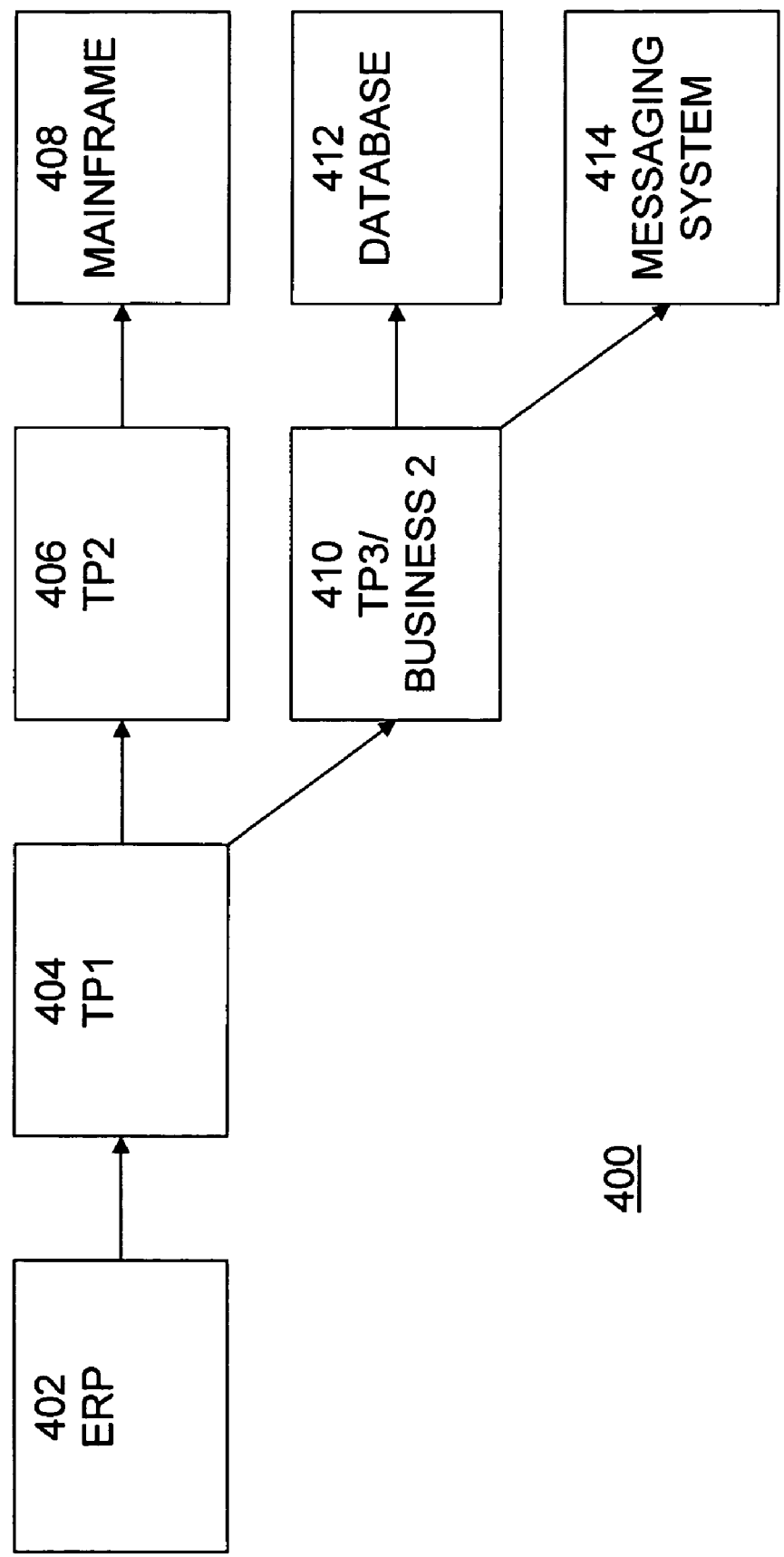
FIG. 4 is a block diagram of an exemplary business process to which the present invention may be applied.

This is a simple example and, automation benefits aside, could potentially be recreated manually. There are much more complex architectures and failure scenarios to consider however. An example of this is if in the previous example the TP was able to issue a successful commit on the first account's database, but the second database crashed before receiving its commit message from the TP. There are a number of different protocols defined for recovery scenarios, however, all rely on some form of log to remember the last stable state and use an algorithm that adheres to the given protocol to recover by rolling back or committing as appropriate to maintain an ACID outcome. Further failure issues may occur during the recovery process itself. In a similar way, compensation activities can occur in complex business process transactions where for example a travel agency must book plane reservations that coincide with hotel reservations (should one hotel become available, another two might fit the same timeframe, etc.). As mentioned the scenarios are further complicated by the underlying architecture which, particularly in the case of webservice transactions, e.g., may span multiple TPs, protocols, business entities, etc. as in the example shown in FIG. 4. In this diagram the transaction is actually initiated by an outside system, specifically an Enterprise Resource Provider 402 (ERP) such as SAP® or PEOPLESOFT®. The transaction context inflow "infects" the transaction processor 402 (TP1) with an existing transaction (distinguishing it from a transaction created by the TP) and effectively enlists TP1 402 as a special type of participating resource often referred to a sub or interposed coordinator. The called TP1 402 in turn requires services and resources in other entities (where entities may refer to other companies) including but not limited to other transaction processors (such as TP2 406, TP3 410) that again may require the resources (such as a MAINFRAME 408, DATABASE 412, MESSAGING SYSTEM 414, etc.) and so on.

Figure 5:
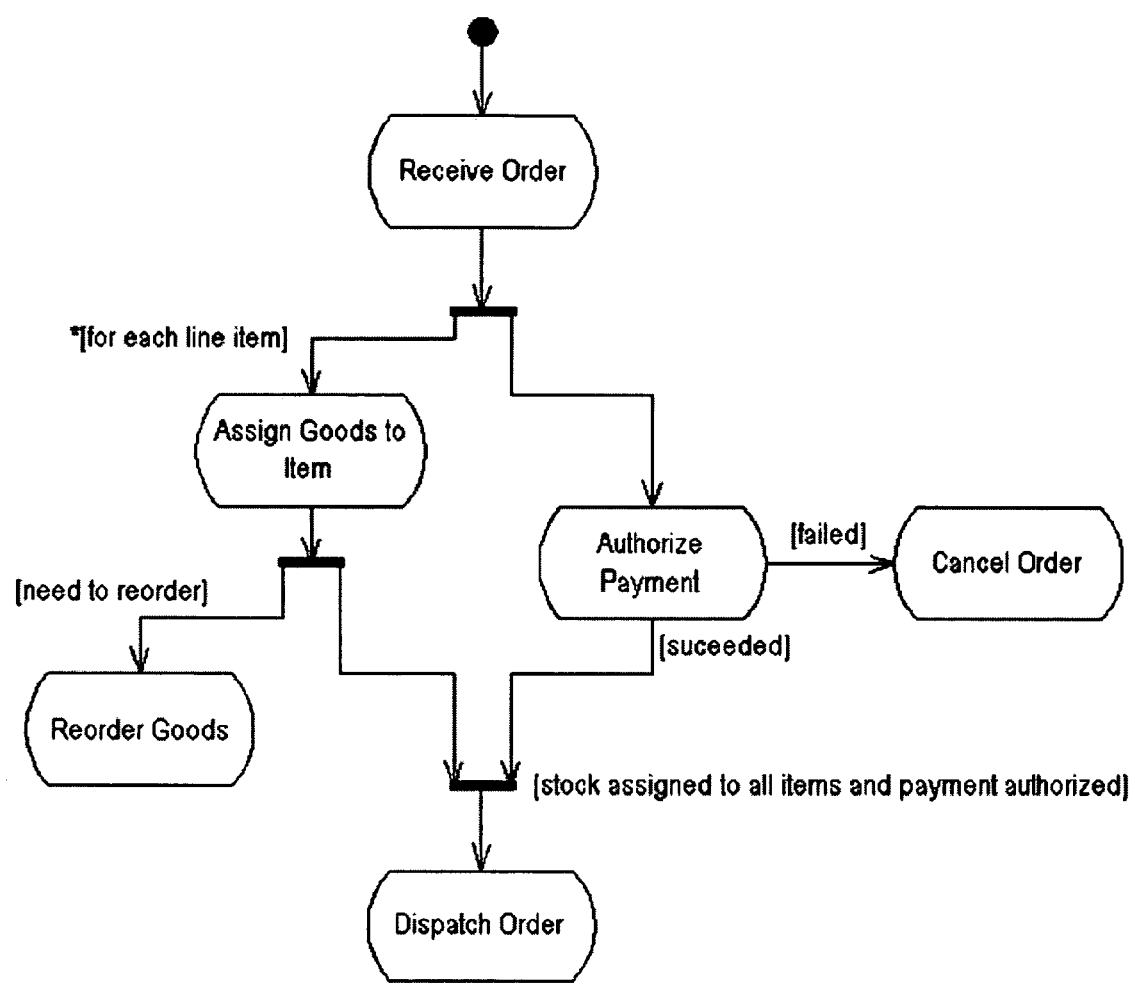
FIG. 5 is a data flow diagram of an exemplary business process to which the present invention may be applied.

In a similar way, compensation activities can occur in complex business process transactions such as the one illustrated in FIG. 5. The failure framework of the present invention can test this and also simulate various responses from interaction points in workflows such as the payment authorization shown in FIG. 5. In this diagram a failure creator can situate a failure framework at one or more of the connection points of the activity in order to control what the outcome or decision of the process is or cause a failure outright. As an example, the framework could be positioned at the appropriate location of the Authorize Payment node to induce or intercept and dispatch a 'failed' or 'succeeded' message or fail at any point of the this node's processing. The result of Cancel Order, Reorder Goods, or failure reaction can then be determined and analyzed.

Beyond failures due to crashes, lost messages, etc. there is a potential for malicious and corrupted messages in any number of scenarios as well. Byzantine general formulas have long been a study in distributed processing. The framework can simulate such situations by intercepting calls and forwarding or replying with bogus information. It is easy to see the adverse effects of a TP system subject to such misleading messages if no consensus algorithm is in place to account for them. Another scenario involves security concerns such as the interception of private information, stolen identities, etc. The framework can also be set to carry this out with minimal effort.

Figure 6:
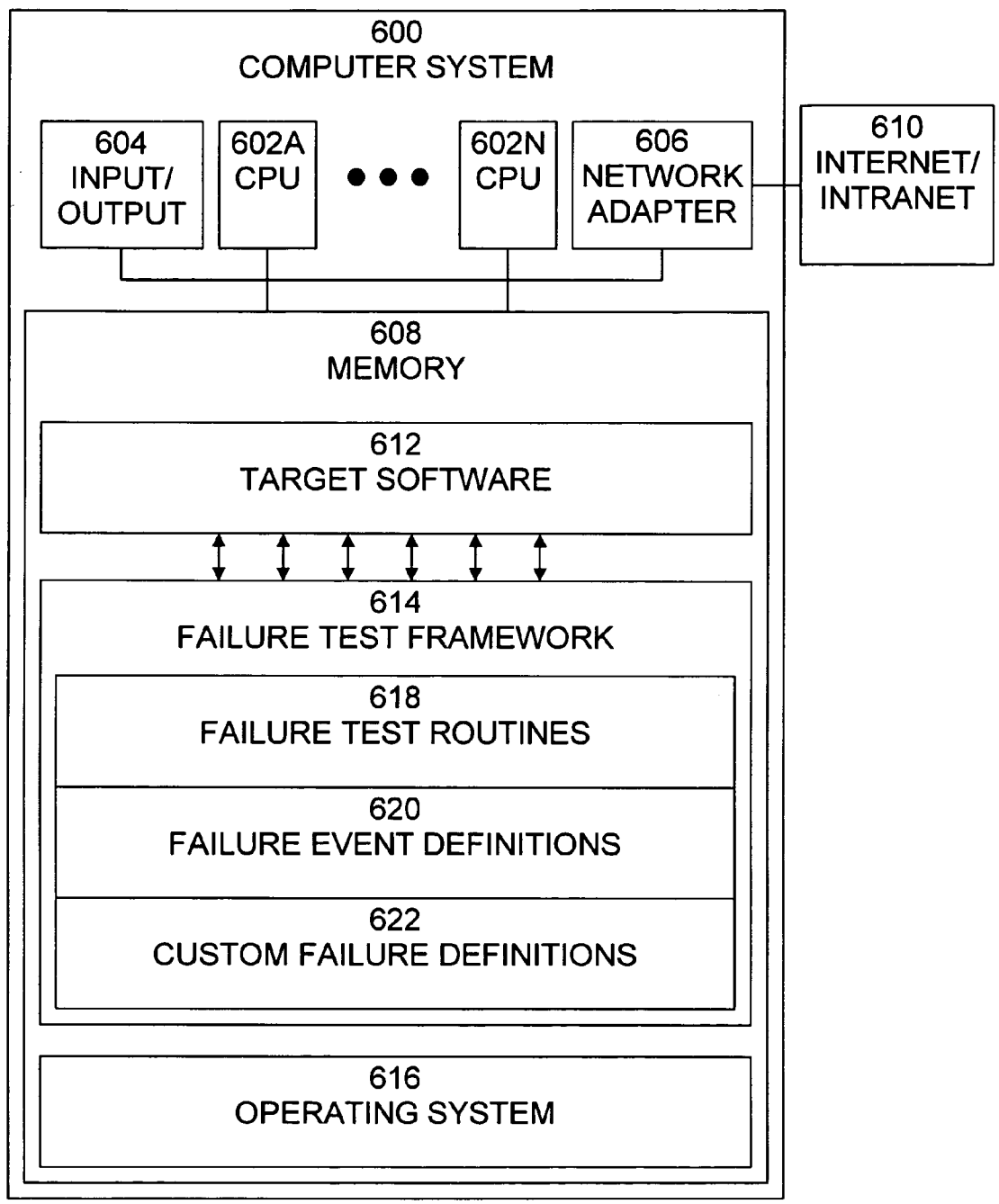
FIG. 6 is an exemplary block diagram of a computer system, in which the present invention may be implemented.

An exemplary block diagram of a computer system 600, in which the present invention may be implemented, is shown in FIG. 6. System 600 is typically a programmed general-purpose computer system, such as a personal computer, workstation, server system, and minicomputer or mainframe computer. System 600 includes one or more processors (CPUs) 602A-602N, input/output circuitry 604, network adapter 606, and memory 608. CPUs 602A-602N execute program instructions in order to carry out the functions of the present invention. Typically, CPUs 602A-602N are one or more microprocessors, such as an INTEL PENTIUM® processor. FIG. 6 illustrates an embodiment in which System 600 is implemented as a single multi-processor computer system, in which multiple processors 602A-602N share system resources, such as memory 608, input/output circuitry 604, and network adapter 606. However, the present invention also contemplates embodiments in which System 600 is implemented as a plurality of networked computer systems, which may be single-processor computer systems, multi-processor computer systems, or a mix thereof.

Input/output circuitry 604 provides the capability to input data to, or output data from, database/System 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces database/System 600 with Internet/intranet 610. Internet/intranet 610 may include one or more standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions of system 600. Memory 608 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 608 vary depending upon the function that system 600 is programmed to perform. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 6, memory 608 includes target software 612, failure test framework 614, and operating system 616. Target software 612 includes software object, routines, modules, systems, etc., that are undergoing functional failure testing. Failure test framework is software that implements the objects and processes of the present invention to perform functional failure testing of target software 612. Failure test framework 614 includes failure test routines 618, failure event definitions 620, and custom failure definitions 622. Failure test routines implement the functionality of the failure test framework of the present invention. Failure test event definitions 620 specify events that are to be monitored in order to initiate failure actions. Custom failure definitions 622 specify actions to be taken upon detection of a failure test event in order to create or simulate failures for the target software 612. Operating system 628 provides overall system functionality.

As shown in FIG. 6, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for performing functional failure testing of a software-based system comprising:
   monitoring execution of a target software for occurrence of a specific event that indicates that a particular failure action is to be performed, wherein a client initiates a routine that triggers the occurrence of the specific event and the target software is started before the routine is initiated by the client;
   notifying a failure framework when the occurrence of the specific event is detected, wherein the notification is performed by the target software and the failure framework includes failure test routines, failure event definitions, and custom failure definitions;
   configuring the failure framework by setting values via a built-in application programming interface (API) of the failure framework;
   in response to the notification, the failure framework performing the particular failure action of the target software that operatively interacts with the target software;
   asserting an expected response from the target software to the performed particular failure action; and
   monitoring the target software for an actual response to the performed particular failure action.

2. The method of claim 1, further comprising:
   defining the specific event based on a particular action to be taken by the target software under test that would indicate that the failure action should be initiated; and
   defining instructions specifying the failure action to be taken by the failure framework in response to detecting the specific event.

3. The method of claim 2, further comprising:
   attaching the failure framework to the target software; and
   starting execution of the target software.

4. The method of claim 3, wherein the target software comprises at least one application process.

5. The method of claim 3, wherein the target software comprises at least one application process and at least one native process.

6. The method of claim 2, wherein the target software comprises at least one application process and the method further comprises:
   starting execution of a virtual machine with a debugging capability;
   attaching the failure framework to the application process; and
   starting execution of the application process.

7. The method of claim 6, wherein the monitoring step comprises:
   monitoring execution of the application process using the debugging capability.

8. A system for performing functional failure testing of a target software comprising:
   a processor operable to execute computer program instructions; and
   a memory operable to store computer program instructions executable by the processor, for performing the steps of:
   defining a specific event in response to which failure actions are to be initiated;
   specifying a failure action to be initiated upon occurrence of the specific event;
   monitoring execution of the target software for occurrence of the specific event that indicates that a particular failure action is to be performed, wherein a client initiates a routine that triggers the occurrence of the specific event and the target software is started before the routine is initiated by the client;
   notifying a failure framework when the occurrence of the specific event is detected, wherein the notification is performed by the target software and the failure framework includes failure test routines, failure event definitions, and custom failure definitions;
   configuring the failure framework by setting values via a built-in application programming interface (API) of the failure framework;

in response to the notification, the failure framework performing the particular failure action of the target software that operatively interacts with the target software;

receiving an expected response from the target software to the performed particular failure action; and monitoring the target software for an actual response to the performed particular failure action.

9. The system of claim 8, wherein the target software comprises at least one application process.

10. The system of claim 8, wherein the target software comprises at least one application process and at least one native process.

11. The system of claim 8, wherein the target software comprises at least one process and the system further comprises:

a virtual machine with a debugging capability attached to the application process and operable to execute the application process.

12. The system of claim 11, wherein the virtual machine is further operable to monitor execution of the application process using the debugging capability.

13. A computer program product embodied in a computer-readable storage medium storing instructions for operating a web-based application, said instructions being arranged, upon execution thereof, to cause one or more processors to perform the steps of:

monitoring execution of a target software for occurrence of a specific event that indicates that a particular failure action is to be performed, wherein a client initiates a routine that triggers the occurrence of the specific event and the target software is started before the routine is initiated by the client;

notifying a failure framework when the occurrence of the specific event is detected, wherein the notification is performed by the target software and the failure framework includes failure test routines, failure event definitions, and custom failure definitions;

configuring the failure framework by setting values via a built-in application programming interface (API) of the failure framework;

in response to the notification, the failure framework performing the particular failure action of the target software that operatively interacts with the target software;

asserting an expected response from the target software to the performed particular failure action; and monitoring the target software for an actual response to the performed particular failure action.

14. The computer program product of claim 13, further storing instructions for performing the steps of:

defining the specific event based on a particular action to be taken by the target software under test that would indicate that the failure action should be initiated; and defining instructions specifying the failure to be taken by the failure framework in response to detecting the specific event.

15. The computer program product of claim 14, further storing instructions for performing the steps of:

attaching the failure framework to the target software; and starting execution of the target software.

16. The computer program product of claim 15, wherein the target software comprises at least one application process.

17. The computer program product of claim 15, wherein the target software comprises at least one application process and at least one native process.

18. The computer program product of 14, wherein the target software comprises at least one application process and the method further comprises:

starting execution of a virtual machine with a debugging capability;

attaching the failure framework to the application process; and starting execution of the application process.

19. The computer program product of 18, wherein the monitoring step comprises:

monitoring execution of the application process using the debugging capability.

* * * * *

UNITED STATES PATENT AND TRADEMARK OFFICE
CERTIFICATE OF CORRECTION

| | | |
|---|---|---|
| PATENT NO. | : 7,877,733 B2 | Page 1 of 1 |
| APPLICATION NO. | : 10/890237 | |
| DATED | : January 25, 2011 | |
| INVENTOR(S) | : Parkinson et al. | |

It is certified that error appears in the above-identified patent and that said Letters Patent is hereby corrected as shown below:

In column 5, line 4-5, Delete "eventreached" and insert -- eventReached --, therefor.

In column 8, line 20, in Claim 2, after "the" insert -- particular --.

In column 8, line 51, in Claim 8, delete "arc" and insert -- are --, therefor.

In column 10, line 26, in Claim 18, after "of" insert -- claim --.

In column 10, line 34, in Claim 19, after "of" insert -- claim --.

Signed and Sealed this
Twentieth Day of September, 2011

David J. Kappos
*Director of the United States Patent and Trademark Office*